(12) United States Patent
Uchida

(10) Patent No.: US 6,982,047 B2
(45) Date of Patent: Jan. 3, 2006

(54) SURFACE-TREATED ULTRAFINE METAL POWDER, METHOD FOR PRODUCING THE SAME, CONDUCTIVE METAL PASTE OF THE SAME, AND MULTILAYER CERAMIC CAPACITOR USING SAID PASTE

(75) Inventor: Morishige Uchida, Chiba (JP)

(73) Assignee: Kawatetsu Mining Co., Ltd., Tokyo (JP)

( * ) Notice: Subject to any disclaimer, the term of this patent is extended or adjusted under 35 U.S.C. 154(b) by 0 days.

(21) Appl. No.: 10/712,092

(22) Filed: Nov. 14, 2003

(65) Prior Publication Data

US 2004/0175569 A1    Sep. 9, 2004

(30) Foreign Application Priority Data

Mar. 3, 2003 (JP) .............................. 2003-055493

(51) Int. Cl.
*H01B 1/02* (2006.01)
*B22D 39/00* (2006.01)
*H01G 4/008* (2006.01)

(52) U.S. Cl. ............... 252/513; 252/514; 252/515; 252/519; 252/520; 252/521; 428/548; 428/570; 428/621; 428/632; 428/639; 428/385; 428/386; 428/389; 361/305; 361/321.4; 427/215; 427/216

(58) Field of Classification Search ............... 428/546, 428/548, 570, 375, 385–386, 389, 621, 632, 428/639; 252/513–515, 519–521; 361/305, 361/321.4; 427/215–216
See application file for complete search history.

(56) References Cited

U.S. PATENT DOCUMENTS

| 4,275,373 A | 6/1981 | Howard |
| 4,970,124 A | 11/1990 | Oltean et al. |
| 6,503,291 B2 * | 1/2003 | Hosokura et al. ............. 75/351 |
| 2002/0055002 A1 | 5/2002 | Toshima et al. |

FOREIGN PATENT DOCUMENTS

JP         A 11-343501        12/1999

* cited by examiner

*Primary Examiner*—Cathy F. Lam
(74) *Attorney, Agent, or Firm*—Oliff & Berridge, PLC

(57) ABSTRACT

The present invention improves the oxidation resistance of an ultrafine metal powder for use in the internal electrode of a multilayer ceramic capacitance and suppresses an increase in the thickness of a metal internal electrode film resulting from the spheroidization of the molten metal under surface tension during the formation of the metal internal electrode film. The ultrafine metal powder has a sulfur-containing compound of not less than one element selected from the group consisting of Y, Zr, and La present on the surface of the particle thereof and is produced by performing an ultrafine metal powder purification step of dispersing the ultrafine metal powder in a slurry, a surface treatment step of adding an aqueous solution containing a sulfate of not less than one element selected from the group consisting of Y, Zr, and La to the slurry to form the compound on the surface of the metal particle, a filtering step, and a drying step.

13 Claims, 6 Drawing Sheets

US 6,982,047 B2

SURFACE-TREATED ULTRAFINE METAL POWDER, METHOD FOR PRODUCING THE SAME, CONDUCTIVE METAL PASTE OF THE SAME, AND MULTILAYER CERAMIC CAPACITOR USING SAID PASTE

BACKGROUND OF THE INVENTION

1. Field of the Invention

The present invention relates to a surface-treated ultrafine metal powder for use in a conductive paste filler or in the internal electrode of a multilayer ceramic capacitor, to a method for producing the same, to the conductive metal paste, and to the multilayer ceramic capacitor.

2. Description of the Related Art

An ultrafine metal powder used in the internal electrode of a multilayer ceramic capacitor is a high-purity metal powder having an average particle diameter of, e.g., 0.1 to 1.0 $\mu$m and a generally spherical particle configuration. The ultrafine metal powder is produced by a chemical vapor phase reaction, changed into a paste with a binder such as an organic resin added thereto, and then used. The average particle diameter used herein is a volume/area average diameter (d3) (that is, the ratio indicated by (total volume)/(total area) of particles) in a number-based distribution.

The paste is coated in a thin layer onto a ceramic green sheet composed of a ceramic dielectric material by screen printing or the like. A laminated structure consisting of several hundreds of such ceramic green sheets with thin layers coated thereon, i.e., internal electrode layers is subjected to a degreasing step, a sintering step, and a firing step, whereby a multilayer ceramic capacitor is produced.

To implement a recent multilayer ceramic capacitor smaller in size and larger in capacitance, the number of the ceramic green sheets, including the internal electrode layers, should be increased from several hundreds to about one thousand. To complete the technology, the thickness of each of the internal electrode layers should be reduced from 3 $\mu$m, which is the thickness of an internal electrode layer used conventionally, to 1.5 $\mu$m or less. Accordingly, D90 of the particle size distribution of an ultrafine metal powder as the material of the internal electrode layer is desired to be low correspondingly. Here, D90 indicates a particle diameter corresponding to cumulative 90% in the particle size distribution of an ultra-fine metal powder, which is obtained by measurement and shown in a number-based representation.

In recent years, an ultrafine metal powder having an average particle diameter of about 0.1 to 0.2 $\mu$m, which is finer than a conventional ultrafine metal powder having an average particle diameter of about 0.4 $\mu$m, has been used. This is because D90 of the particle size distribution of an ultrafine metal powder having a smaller average particle diameter is smaller and therefore D90 of the ultrafine metal powder with an average particle diameter of about 0.1 to 0.2 $\mu$m is smaller than D90 of the ultrafine metal powder with an average particle diameter of about 0.4 $\mu$m.

In general, an ultrafine metal powder with a small particle diameter exhibits peculiar properties. Because of its particularly active surface state, oxidational expansion due to an oxidation reaction occurs in a low-temperature range (200 to 300° C.) or heat shrinkage is started even in a low-temperature region (400 to 500° C.), which adversely affects electrode formation.

Specifically, an internal electrode using an ultrafine metal powder is cracked owing to oxidational expansion in an oxidizing atmosphere in a degreasing step. Another problem is encountered during the formation of an electrode film in a heating step that the spheroidization under surface tension of the molten metal causes partial increase of thickness of the metal internal electrode. In the latter case, in particular, forming a uniformly thin electrode film becomes difficult and a sufficient large area required for the internal electrode film can not be obtained so that an electric capacitance of the capacitor does not reach an objective value. Since the thick portion is formed through the coagulation of ambient metal, the electrode film is partially ruptured so that the coverage area of the electrode (the area of the portion of the ceramic sheet covered with the electrode film) is reduced. If the film is significantly increased in thickness, the ruptured portions of the film are scattered in a dotted island configuration. The ruptured portions of the film are electrically insulated so that they are non-functional as the electrode film. When the partially thick portion of the film has a projecting configuration, the projecting portion penetrates through the ceramic sheet layer so that the product is formed defective as the electrodes are short-circuited. Even when the projecting portion does not penetrate through the ceramic sheet layer, the inter-electrode distance (distance between neighboring electrodes) is partially reduced so that an increase in current density occurs to cause a degraded lifetime of a multilayer ceramic capacitor.

To prevent the above problems, it has been a conventional practice to strictly control temperature and oxygen concentration in the degreasing step and raise the starting temperature of shrinkage by adding a material similar in composition to the ceramic dielectric material to the metal paste.

When an ultrafine metal powder with an average particle diameter of about 0.1 to 0.2 $\mu$m, which is smaller than that of the conventional ultrafine metal powder, begins to be used, however, the foregoing methods commonly practiced against the problems (such as the control of oxygen concentration and temperature and the addition of a material similar in composition to the ceramic dielectric material) are no more effective so that improvements in the oxidation characteristic and heat shrinkage characteristic of the ultrafine metal powder are required.

There has been proposed a technique for reducing defects such as delamination and a crack caused by difference in amounts of heat shrinkage between a ceramic base material and an internal electrode material in heating a multilayer ceramic capacitor. For example, Japanese Laid-Open Patent Publication No. HEI 11-343501 discloses the technique pertaining to a composite Ni fine powder in which an oxide such as $TiO_2$, $MnO_2$, or $Cr_2O_3$ is present on the surfaces of Ni particles that have been oxidized through surface-treatment. The fine powder is produced by a wet treatment method including an addition of an aqueous solution containing a metal salt to a slurry of the fine powder and a pH adjustment thereafter using an acid or alkali.

Even with the foregoing technique, it is impossible to suppress an increase in the thickness of the metal internal electrode resulting from the oxidational expansion of the ultrafine metal powder in an oxidizing atmosphere in the degreasing step and from the spheroidization of the molten metal under surface tension during the formation of the electrode film in the firing step.

In the conventional process, there has been demanded an ultrafine metal powder of which the oxidational expansion in the degreasing step and the spheroidization of the molten metal under surface tension during the formation of the electrode film in the firing step have been suppressed during the production of a multilayer ceramic capacitor. However, there has been no ultrafine metal powder which satisfies the demand in either of the cases where the average particle diameter thereof is about 0.4 μm or where the average particle diameter thereof is about 0.1 to 0.2 μm.

SUMMARY OF THE INVENTION

It is therefore an object of the present invention to improve the oxidation resistance of an ultrafine metal powder and suppress an increase in the thickness of a metal internal electrode film resulting from the spheroidization of the molten metal under surface tension during the formation of the electrode film. Specifically, an ultrafine metal powder capable of forming a uniformly thin electrode film is provided by reducing the mass gain of the ultrafine metal powder by oxidation in an atmosphere in the degreasing step of the production of a multilayer ceramic capacitor and reducing the surface tension of the molten metal during the formation of the electrode film.

Another object of the present invention is to provide a conductive paste produced from the foregoing ultrafine metal powder and also to provide a multilayer ceramic capacitor produced from the foregoing ultrafine metal powder for the internal electrode of the capacitor.

The present invention has been achieved to attain the foregoing objects and provides a surface-treated ultrafine metal powder, wherein a sulfur-containing compound of not less than one element selected from the group consisting of Y, Zr, and La is present on a surface of a particle of the ultrafine metal powder. It is assumed here that the sulfur-containing compound is a sulfide or a compound containing an atomic group represented by SxOy and the atomic group represented by SxOy is any of $SO_2$ (sulfonyl group), $SO_3$ (sulfurous acid group), $S_2O_3$ (thiosulfuric acid group), and $SO_4$ (sulfuric acid group).

The sulfur-containing compound is effectively and preferably present in an amount such that the elements contained in the sulfur-containing compound are in a total amount of 0.05% to 6% by mass and S contained in the sulfur-containing compound is in an amount of 0.04% to 4% by mass, each relative to the ultrafine metal powder as a whole. The ultrafine metal powder as a whole is defined here as the total amount of the ultrafine metal powder before a surface treatment is performed with respect thereto.

More preferably, Y, Zr, and La contained in the sulfur-containing compound is in a total amount of 0.5% to 1.5% by mass relative to the ultrafine metal powder as a whole.

A metal element of the ultrafine metal powder is preferably one selected from the group consisting of Ni, Cu, Ag, Mo, W, Co, and Ta.

The ultrafine metal powder of a Ni alloy containing one or more elements selected from the group consisting of V, Cr, Nb, Mo, Ta, W, Zr, Y, La, Mg, Ti, Ba, and Ca is excellent.

Preferably, the ultrafine metal powder is a powder of a Cu alloy containing one or more elements selected from the group consisting of V, Cr, Nb, Mo, Ta, W, Zr, Y, La, Mg, Ti, Ba, and Ca.

Each of the surface-treated ultrafine metal powders can be produced by: adding an aqueous solution containing a sulfate of not less than one element selected from the group consisting of Y, Zr, and La to a slurry having the ultrafine metal powder dispersed therein; and performing a surface treatment for forming a sulfur-containing compound of not less than one element selected from the group consisting of Y, Zr, and La on a surface of the ultrafine metal powder.

The present invention also provides a conductive metal paste produced by using any of the foregoing ultrafine metal powders and a multilayer ceramic capacitor produced by using any of the foregoing ultrafine metal powders as an internal electrode.

In accordance with the present invention, the oxidation resistance of the ultrafine metal powder is improved and the mass gain of the ultrafine metal powder by oxidation in an atmosphere in the degreasing step in the production of the multilayer ceramic capacitor is reduced. In addition, the formation of a crack due to oxidational expansion after the degreasing step is prevented. Moreover, the electrode film can be formed to have a reduced and uniform thickness, which reduces a short-circuit failure rate and improves the breakdown voltage characteristic. As a consequence, an improved production yield which satisfies product specifications is achievable in the field of electronic components. This reduces industrial wastes resulting from defective components so that the present invention is also extremely variable in terms of environmental problems.

DETAILED DESCRIPTION OF THE PREFERRED EMBODIMENTS

The present inventor has found that the mass gain of an ultrafine metal powder by oxidation in an oxidizing atmosphere is suppressed by causing not less than one sulfur-containing compound of an element selected from the group consisting of Y, Zr, and La to be present on the surface of the ultrafine metal powder. The reason for this may be that the oxidation resistance of the ultrafine metal powder is improved by uniformly forming not less than one sulfur-containing compound of an element selected from the group consisting of Y, Zr, and La on the surface, thereby stabilizing the surface free energy of the ultrafine metal powder, and interrupting or suppressing the supply of oxygen to the surface of the metal.

The present inventor has also found that, if the sulfur-containing compound of an element selected from the group consisting of Y, Zr, and La is present, the surface tension of the molten metal during the formation of an electrode film at a temperature of 1000° C. or more is reduced. The presence of the sulfur-containing compound of an element selected from the group consisting of Y, Zr, and La ensures the formation of a uniformly thin electrode film.

If Y, Zr, and La contained in the sulfur-containing compound is in a total mount of less than 0.05% by mass relative to the ultrafine metal powder as a whole or if S contained in the sulfur-containing compound is in an amount of less than 0.04% by mass relative to the ultrafine metal powder as a whole, the entire surface of the ultrafine metal powder is not covered with a layer of the sulfur-containing compound so that sufficient oxidation resistance is not obtained.

Conversely, if Y, Zr, and La content in the sulfur-containing compound is in a total amount in excess of 6% by mass relative to the ultrafine metal powder as a whole or if S content in the sulfur-containing compound is in an amount in excess of 4% by mass relative to the ultrafine metal powder as a whole, the number of coating layers required to interrupt or suppress the supply of oxygen is exceeded so that an effect achieved by an excess amount of coating is low, and it is uneconomical in this case.

In the present invention, an ultrafine metal powder having an average particle diameter of 0.1 to 1.0 μm, having a generally spherical particle configuration, and containing a small amount of impurity is appropriate. Preferably, the ultrafine metal powder is produced by a chemical vapor deposition which provides a metal powder by vaporizing a metal chloride and then reducing the vaporized metal chloride by using $H_2$ or the like.

Figure 1:
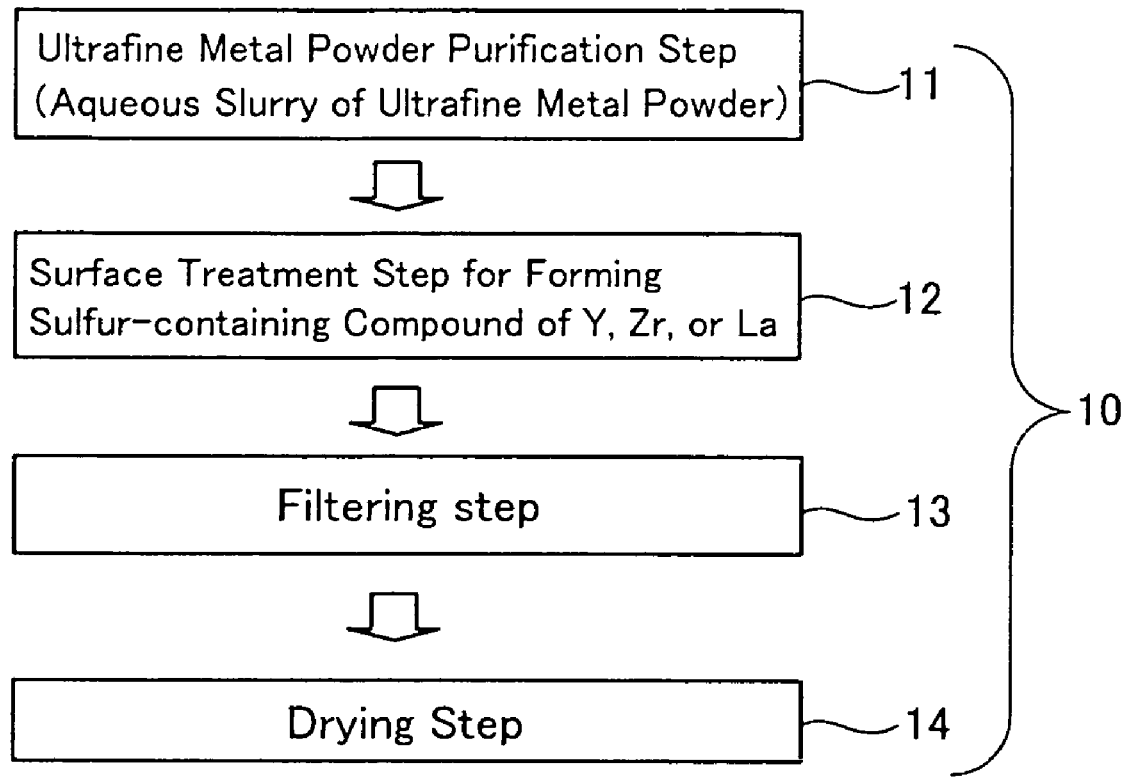
FIG. 1 is a flow chart illustrating a production process for an ultrafine metal powder according to the present invention.

A description will be given herein below to the embodiments of the present invention with reference to the drawings. FIG. 1 is a flow chart illustrating an ultrafine metal powder production process 10 according to the present invention.

An ultrafine metal powder purification step (an aqueous slurry of an ultrafine metal powder) 11 is a step of purifying an ultrafine metal powder that has been produced by a chemical vapor phase reaction to have an average particle diameter of 0.1 to 1.0 μm, a generally spherical particle configuration, and high purity although containing small amount of metal chloride. In this step, an aqueous slurry of the ultrafine metal powder is obtained by removing the residual metal chloride as the raw material of the ultrafine metal powder.

In a surface treatment step 12, a sulfur-containing compound of not less than one element selected from the group consisting of Y, Zr, and La is formed on the surface of the ultrafine metal powder. In this step, a preparatory dispersing treatment using a homomixer or the like is performed with respect to the aqueous slurry of the ultrafine metal powder (at a concentration of 50% by weight) such that the aggregates of the ultrafine metal powder in water are dispersed into primary particles. Then, an aqueous solution containing the sulfur-containing compound of not less than on element selected from Y, Zr, and La is added. At this time, the amount of the aqueous solution to be added is adjusted such that the total amount of Y, Zr, and La in the aqueous solution corresponds to 0.05% to 6% by mass of the total mass of the ultrafine metal powder. A mixing treatment using a homomixer or the like is performed with respect to the aqueous slurry of the ultrafine metal powder with the aqueous solution added thereto at a proper temperature, which is normally 15° C. plus/minus 5° C. As a result, the sulfur-containing compound of not less than one element selected from the group consisting of Y, Zr, and La is formed uniformly on the surface of the ultrafine metal powder.

What is important in the surface treatment step is to ensure the coverage of the surface of the ultrafine metal powder with a required mount of the sulfur-containing compound of not less than one element selected from the group consisting of Y, Zr, and La. In other words, it is necessary for sulfuric acid ions and the like present in the added aqueous solution to be used to form the foregoing sulfur-containing compound of the element. Therefore, the sulfuric acid ions should not be changed into a salt which does not contribute to the formation of the foregoing sulfur-containing compound by a neutralization reaction. If a salt is formed by a neutralization reaction or the like, the sulfuric acid ions and the like which react at the surface of the ultrafine metal powder are extinct so that it is impossible to form the sulfur-containing compound on the surface of the ultrafine metal powder. The technique disclosed in Japanese Laid-Open Patent Publication No. HEI 11-343501 adds an aqueous solution containing at least one or more selected from salts of Ti, Mn, Cr, Al, Si, Y, Zr, and Ba to a slurry having a fine Ni powder dispersed therein, performs pH adjustment by using an acid or alkali, and then performs a surface treatment for forming a metal oxide of the added salt to the surface of the Ni powder. As respective salts of Y and Zr, yttrium sulfate and zirconium sulfate are listed. Aqueous sodium hydroxide is used as an alkali for pH adjustment used in the neutralization of the salt of Y and the salt of Zr. When the treatment is performed by using a sulfate, pH adjustment is performed by using aqueous sodium hydroxide. However, sodium sulfate is generated by the neutralization reaction so that it is impossible to form a sulfide of Y, Zr, or La or a compound of Y, Zr, or La containing an atomic group represented by $S_xO_y$ on the surface of the ultrafine metal powder.

Next, in a filtering step 13, the aqueous slurry of the ultrafine metal powder to which the surface treatment step of forming the sulfur-containing compound of not less than one element selected from the group consisting of Y, Zr, and La has been performed is subjected to a dehydration treatment using a centrifugal separator or a filter such as a pressure filter, so that a dehydrated cake is provided. The dehydrated cake is dried under reduced pressure at a low temperature, which is normally 80 to 200° C., in a drying step 14 to provide the ultrafine metal powder.

The surface of the ultrafine metal powder is exposed to an atmosphere when it is retrieved from a chemical vapor phase production system. It follows therefore that an oxide coating has already been formed on a starting material. When the ultrafine metal powder is dispersed in water in the purification step, OH groups are generated on the surface of the ultrafine metal powder. It can be considered that the OH groups and the added sulfate react with each other to generate a coating of the sulfur-containing compound of Y, Zr, or La. Such a reaction with the OH groups can be considered to be an attribute of a compound containing sulfur, i.e., each of a sulfide and respective compounds having a sulfonyl group, a sulfurous acid group, and a sulfuric acid group.

A conductive metal paste according to the present invention is characterized in that it uses, as a metal powder, the ultrafine metal powder according to the present invention. As an organic binder, a solvent, and an inorganic additive, those used conventionally can be used. For example, 10 parts by weight of a binder resin solution having 12% by mass of ethyl cellulose contained in terpineol are added to 100 parts by weight of the ultrafine metal powder according to the present invention and the resulting mixture is subjected to a 1-hour dispersing treatment using an agitator. Then, the mixture is forced to pass through a 3-roll mill five times, subjected to a filtering treatment using a pressure filter of cartridge-filter type, subjected to viscosity adjustment such that the nickel powder content becomes about 45 wt %, whereby the conductive paste is obtained.

A multilayer ceramic capacitor according to the present invention is characterized in that the metal powder of the conductive metal paste used in the internal electrode thereof is the ultrafine metal powder according to the present invention. The multilayer ceramic capacitor according to the present invention can be produced by a conventional production method using conventional raw materials other than metal powder.

For example, the multilayer ceramic capacitor according to the present invention is produced by printing a ceramic green sheet having a given composition onto a PET film by a doctor blade method. The thickness in the range of 2 to 10 μm of the green sheet is preferable for a small ceramic capacitor having a larger capacitance. Coating of the conductive metal paste is given by a screen printing method on the ceramic green sheet and dried. The amount of coating is adjusted such that the thickness of an electrode film after drying becomes 2 μm or less. If the conductive paste is used by weight of 0.7 mg/cm² or less calculated in terms of metal, an objective film thickness of 2 μm or less is obtainable.

A plurality of ceramic green sheets coated with the conductive metal paste are laminated and subjected to hot press molding. Thereafter, the multilayer molded structure is cut into a specified size to form the green chip of one multilayer ceramic capacitor.

The green chip is subjected to a degreasing treatment performed in an atmosphere at 280 to 300° C. for 2 to 3 hours by using a drying furnace and then heated in a non-oxidizing atmosphere at 1100 to 1300° C. for 2 to 3 hours. After heating, a reoxidizing treatment is performed at the temperature of 900 to 1100° C. for 2 hours in an atmosphere in which the partial pressure of oxygen is 20 to 30 ppm so that a multilayer ceramic sintered compact is obtained. Coating of a copper paste is given as an external electrode on each of the ends of the resulting multilayer ceramic sintered structure to provide electrical connection with the internal electrode, whereby the multilayer ceramic capacitor is obtained.

EXAMPLES

A specific description will be given to the present invention by using examples and comparative examples.

Examples 1 and 2

There was prepared 10 L of an aqueous slurry of a Ni ultrafine powder (at a concentration of 50% by weight) after the purification step 11 for an ultrafine nickel powder that had been produced by a chemical vapor phase reaction to have an average particle diameter of 0.2 μm, a generally spherical particle configuration, and high purity. The aqueous slurry was subjected to a preparatory treatment using a homomixer (commercially available from TOKUSHU KIKA KOGYO CO., LTD.). On the other hand, 3 L of an aqueous solution containing $Y_2(SO_4)_3$ having a mass such that the Y content becomes 1% by mass relative to the mass of the ultrafine nickel powder was produced. The produced aqueous $Y_2(SO_4)_3$ solution was added to the aqueous slurry of the ultrafine nickel powder after the preparatory treatment and then a dispersing treatment at a number of revolutions of 8000 rpm was performed at 15° C. plus/minus 5° C. for 60 minutes. Thereafter, pressure filtering using nitrogen was performed. Then, drying was performed in a vacuum drier at a temperature of 170° C. for 12 hours, whereby the ultrafine metal powder was obtained.

A conductive metal paste was produced from the obtained surface-treated ultrafine Ni powder. For the production, kneading and dispersion was performed by using a 3-roll mill. As additives to the conductive metal paste, ethyl cellulose dissolved in terpineol and barium titanate (BT-01 commercially available from Sakai Chemical Industry Co., Ltd.) were used as an organic binder and an inorganic additive, respectively, while terpineol and butyl carbitol were used as a solvent. The composition of the conductive metal paste is shown in Table 1.

TABLE 1

| Composition of Conductive Metal Paste | |
|---|---|
| Compositions | Composition Ratio (% by mass) |
| Ultrafine Metal Powder | 43.0 |
| Barium Titanate (BT-01) | 8.6 |
| Ethyl Cellulose | 2.5 |
| Terpineol | 23 |
| Butyl Carbitol | 22.9 |

A multilayer ceramic capacitor was produced by using the produced conductive metal paste. The thickness of each of green sheets was adjusted to about 7 μm by using an X7R characteristic material as a dielectric ceramic material. The objective outer sizes of the multilayer ceramic capacitor are a width of 1.6 mm, a length of 3.2 mm, and a thickness of about 1 mm. The thickness varies with the number of laminated layers. The number of the dielectric ceramic layers to be laminated was set to 100. The ceramic green sheets having the conductive metal paste coat thereon were thus laminated and formed into a multilayer molded structure under a pressure of 800 kg/cm² (8 GPa) by using a thermal press. The multilayer molded structure was cut into the foregoing width and length sizes to form a green chip of one multilayer ceramic capacitor.

By using a drying furnace, a degreasing treatment was performed with respect to the green chip by holding it in an atmosphere at a specified set temperature for 2 hours. The degreased green chip was then heated in a non-oxidizing atmosphere (in which the partial pressure of oxygen was $10^{-14}\%$) at 1250° C. for 2 hours. After the heating, a reoxidizing treatment was performed in an atmosphere in which the partial pressure of oxygen was 20 to 30 ppm at 1050° C. for 2 hours to provide a multilayer ceramic sintered structure. Each of the ends of the obtained multilayer ceramic sintered structure was coated with a copper paste as an external electrode to provide electrical connection with the internal electrode, whereby the multilayer ceramic capacitor was obtained.

To check the oxidation resistance, the two standard temperatures of 300° C. and 350° C. were set as the degreasing condition.

Example 3

Evaluation was performed in the same manner as in Example 1 except that an aqueous solution containing $Y_2(SO_4)_3$ in a mass such that the Y content becomes 5% by mass relative to the mass of the ultrafine nickel powder was added.

Example 4

Evaluation was performed in the same manner as in Example 1 except that an aqueous solution containing $Y_2(SO_4)_3$ in a mass such that the Y content becomes 6% by mass relative to the mass of the ultrafine nickel powder was added.

Example 5

Evaluation was performed in the same manner as in Example 1 except that an aqueous solution containing $Y_2(SO_4)_3$ in a mass such that the Y content becomes 0.05% by mass relative to the mass of the ultrafine nickel powder was added.

Example 6

Evaluation was performed in the same manner as in Example 1 except that an aqueous solution containing $Zr(SO_4)_2$ in a mass such that the Zr content becomes 1% by mass relative to the mass of the ultrafine nickel powder was added.

Example 7

Evaluation was performed in the same manner as in Example 1 except that an aqueous solution containing $La_2(SO_4)_3$ in a mass such that the La content becomes 1% by mass relative to the mass of the ultrafine nickel powder was added.

Example 8

Evaluation was performed in the same manner as in Example 1 except that an aqueous solution containing $Y_2(SO_4)_3$ in a mass such that the Y content becomes 1% by mass relative to the mass of an ultrafine Cu powder that had been produced by a chemical vapor phase reaction to have an average particle diameter of 0.2 µm, a generally spherical particle configuration, and high purity was added.

Example 9

Evaluation was performed in the same manner as in Example 1 except that an aqueous solution containing $Y_2(SO_4)_3$ in a mass such that the Y content becomes 1% by mass relative to the mass of an ultrafine Ag powder that had been produced by a chemical vapor phase reaction to have an average particle diameter of 0.2 µm, a generally spherical particle configuration, and high purity was added.

Example 10

Evaluation was performed in the same manner as in Example 1 except that an aqueous solution containing $Y_2(SO_4)_3$ in a mass such that the Y content becomes 1% by mass relative to the mass of an ultrafine Mo powder that had been produced by a chemical vapor phase reaction to have an average particle diameter of 0.2 µm, a generally spherical particle configuration, and high purity was added.

Example 11

Evaluation was performed in the same manner as in Example 1 except that an aqueous solution containing $Y_2(SO_4)_3$ in a mass such that the Y content becomes 1% by mass relative to the mass of an ultrafine W powder that had been produced by a chemical vapor phase reaction to have an average particle diameter of 0.2 µm, a generally spherical particle configuration, and high purity was added.

Example 12

Evaluation was performed in the same manner as in Example 1 except that an aqueous solution containing $Y_2(SO_4)_3$ in a mass such that the Y content becomes 1% by mass relative to the mass of an ultrafine Co powder that had been produced by a chemical vapor phase reaction to have an average particle diameter of 0.2 µm, a generally spherical particle configuration, and high purity was added.

Example 13

Evaluation was performed in the same manner as in Example 1 except that an aqueous solution containing $Y_2(SO_4)_3$ in a mass such that the Y content becomes 1% by mass relative to the mass of an ultrafine Ta powder that had been produced by a chemical vapor phase reaction to have an average particle diameter of 0.2 µm, a generally spherical particle configuration, and high purity was added.

Example 14

Evaluation was performed in the same manner as in Example 1 except that an aqueous solution containing $Y_2(SO_4)_3$ in a mass such that the Y content becomes 1% by mass relative to the mass of an ultrafine Ni—Cr alloy powder that had been produced by a chemical vapor phase reaction to have an average particle diameter of 0.2 µm, a generally spherical particle configuration, and high purity was added.

Example 15

Evaluation was performed in the same manner as in Example 1 except that an aqueous solution containing $Y_2(SO_4)_3$ in a mass such that the Y content becomes 1% by mass relative to the mass of an ultrafine Ni—Mo alloy powder that had been produced by a chemical vapor phase reaction to have an average particle diameter of 0.2 µm, a generally spherical particle configuration, and high purity was added.

Example 16

Evaluation was performed in the same manner as in Example 1 except that an aqueous solution containing $Y_2(SO_4)_3$ in a mass such that the Y content becomes 1% by mass relative to the mass of an ultrafine Ni—Ta alloy powder that had been produced by a chemical vapor phase reaction to have an average particle diameter of 0.2 µm, a generally spherical particle configuration, and high purity was added.

Example 17

Evaluation was performed in the same manner as in Example 1 except that an aqueous solution containing $Y_2(SO_4)_3$ in a mass such that the Y content becomes 1% by mass relative to the mass of an ultrafine Ni—W alloy powder that had been produced by a chemical vapor phase reaction to have an average particle diameter of 0.2 µm, a generally spherical particle configuration, and high purity was added.

Example 18

Evaluation was performed in the same manner as in Example 1 except that an aqueous solution containing $Y_2(SO_4)_3$ in a mass such that the Y content becomes 1% by mass relative to the mass of an ultrafine Ni—Mg alloy powder that had been produced by a chemical vapor phase reaction to have an average particle diameter of 0.2 μm, a generally spherical particle configuration, and high purity was added.

Example 19

Evaluation was performed in the same manner as in Example 1 except that an aqueous solution containing $Y_2(SO_4)_3$ in a mass such that the Y content becomes 1% by mass relative to the mass of an ultrafine Cu—Ta alloy powder that had been produced by a chemical vapor phase reaction to have an average particle diameter of 0.2 μm, a generally spherical particle configuration, and high purity was added.

Example 20

Evaluation was performed in the same manner as in Example 1 except that an aqueous solution containing $Y_2(SO_4)_3$ in a mass such that the Y content becomes 1% by mass relative to the mass of an ultrafine Cu—W alloy powder that had been produced by a chemical vapor phase reaction to have an average particle diameter of 0.2 μm, a generally spherical particle configuration, and high purity was added.

Comparative Examples 1 and 2

Evaluation was performed in the same manner as in Example 1 except that an ultrafine nickel powder that had been produced by a chemical vapor phase reaction to have an average particle diameter of 0.2 μm, a generally spherical particle configuration, and high purity and that had not been subjected to the coating treatment with a metal sulfate according to the present invention was used. In short, the samples were unprocessed and corresponding to a conventional article. To check the oxidation resistance, however, the two standard temperatures of 300° C. and 350° C. were set in a degreasing condition when a multilayer ceramic capacitor for a test was produced.

Comparative Example 3

Evaluation was performed in the same manner as in Example 1 except that an ultrafine nickel powder that had been produced by a chemical vapor phase reaction to have an average particle diameter of 0.4 μm, a generally spherical particle configuration, and high purity and that had not been subjected to the coating treatment with a metal sulfate according to the present invention was used. In short, the samples were unprocessed and corresponding to a conventional article.

Comparative Example 4

Evaluation was performed in the same manner as in Example 1 except that an ultrafine copper powder that had been produced by a chemical vapor phase reaction to have an average particle diameter of 0.2 μm, a generally spherical particle configuration, and high purity and that had not been subjected to the coating treatment with a metal sulfate according to the present invention was used. In short, the samples were unprocessed and corresponding to a conventional article.

The results of evaluating the powder characteristics and the multilayer ceramic capacitors for tests according to Examples 1 to 20 and Comparative Examples 1 to 4 are shown collectively in Table 2.

TABLE 2

| Examples | Metals | Average particle diameter (μm) | Added sulfates | Metal content (Wt %) | Power characteristic Mass gain by oxidation (%) | | Oxidation resistance Oxidation starting temperature (°C.) | |
|---|---|---|---|---|---|---|---|---|
| | | | | | | Evaluation | | Evaluation |
| Example 1 | Ni | 0.2 | $Y_2(SO_4)_3$ | 1 | 3 | ⊙ | 310 | ○ |
| Example 2 | Ni | 0.2 | $Y_2(SO_4)_3$ | 1 | 3 | ⊙ | 310 | ○ |
| Example 3 | Ni | 0.2 | $Y_2(SO_4)_3$ | 5 | 0.5 | ⊙ | 320 | ○ |
| Example 4 | Ni | 0.2 | $Y_2(SO_4)_3$ | 6 | 0.45 | ⊙ | 321 | ○ |
| Example 5 | Ni | 0.2 | $Y_2(SO_4)_3$ | 0.05 | 10 | ○ | 290 | △ |
| Example 6 | Ni | 0.2 | $Zr(SO_4)_2$ | 1 | 5 | ⊙ | 305 | ○ |
| Example 7 | Ni | 0.2 | $La_2(SO_4)_3$ | 1 | 4 | ⊙ | 307 | ○ |
| Example 8 | Cu | 0.2 | $Y_2(SO_4)_3$ | 1 | 9 | ○ | 300 | ○ |
| Example 9 | Ag | 0.2 | $Y_2(SO_4)_3$ | 1 | 7 | ○ | 300 | ○ |
| Example 10 | Mo | 0.2 | $Y_2(SO_4)_3$ | 1 | 5 | ⊙ | 302 | ○ |
| Example 11 | W | 0.2 | $Y_2(SO_4)_3$ | 1 | 4 | ⊙ | 306 | ○ |
| Example 12 | Co | 0.2 | $Y_2(SO_4)_3$ | 1 | 5 | ⊙ | 300 | ○ |
| Example 13 | Ta | 0.2 | $Y_2(SO_4)_3$ | 1 | 3 | ⊙ | 306 | ○ |
| Example 14 | Ni—Cr | 0.2 | $Y_2(SO_4)_3$ | 1 | 2 | ⊙ | 315 | ○ |
| Example 15 | Ni—Mo | 0.2 | $Y_2(SO_4)_3$ | 1 | 2 | ⊙ | 314 | ○ |
| Example 16 | Ni—Ta | 0.2 | $Y_2(SO_4)_3$ | 1 | 1.5 | ⊙ | 317 | ○ |
| Example 17 | Ni—W | 0.2 | $Y_2(SO_4)_3$ | 1 | 1.5 | ⊙ | 318 | ○ |
| Example 18 | Ni—Mg | 0.2 | $Y_2(SO_4)_3$ | 1 | 2 | ⊙ | 313 | ○ |
| Example 19 | Cu—Ta | 0.2 | $Y_2(SO_4)_3$ | 1 | 5 | ⊙ | 300 | ○ |
| Example 20 | Cu—W | 0.2 | $Y_2(SO_4)_3$ | 1 | 3 | ⊙ | 304 | ○ |
| Comp. Ex. 1 | Ni | 0.2 | Non | 0 | 14 | | 230 | X |
| Comp. Ex. 2 | Ni | 0.2 | Non | 0 | 14 | | 230 | X |
| Comp. Ex. 3 | Ni | 0.4 | Non | 0 | 10 | | 250 | X |

TABLE 2-continued

| | | | | | | | |
|---|---|---|---|---|---|---|---|
| Comp. Ex. 4 | Cu | 0.2 | Non | 0 | 18 | 200 | X |

Evaluation of prototyped multilayer ceramic capacitors

| Examples | Thickness reduction Electrode film thickness μm | Evaluation | Uniformity Coverage rate % | Evaluation | Degreasing condition Temperature °C. | Oxidational expansion (Number of cracks) After degreasing Number of cracks | After sintering Number of cracks |
|---|---|---|---|---|---|---|---|
| Example 1 | 1.0 | ○ | 95 | ○ | 300 | 0 | 0 |
| Example 2 | 1.0 | ○ | 95 | ○ | 350 | 0 | 0 |
| Example 3 | 1.0 | ○ | 95 | ○ | 300 | 0 | 0 |
| Example 4 | 1.0 | ○ | 95 | ○ | 300 | 0 | 0 |
| Example 5 | 1.3 | ○ | 90 | ○ | 300 | 0 | 0 |
| Example 6 | 1.0 | ○ | 93 | ○ | 300 | 0 | 0 |
| Example 7 | 1.0 | ○ | 93 | ○ | 300 | 0 | 0 |
| Example 8 | 1.2 | ○ | 90 | ○ | 300 | 0 | 0 |
| Example 9 | 1.2 | ○ | 90 | ○ | 300 | 0 | 0 |
| Example 10 | 1.1 | ○ | 90 | ○ | 300 | 0 | 0 |
| Example 11 | 1.1 | ○ | 90 | ○ | 300 | 0 | 0 |
| Example 12 | 1.1 | ○ | 90 | ○ | 300 | 0 | 0 |
| Example 13 | 1.1 | ○ | 90 | ○ | 300 | 0 | 0 |
| Example 14 | 1.1 | ○ | 94 | ○ | 300 | 0 | 0 |
| Example 15 | 1.1 | ○ | 94 | ○ | 300 | 0 | 0 |
| Example 16 | 1.1 | ○ | 95 | ○ | 300 | 0 | 0 |
| Example 17 | 1.1 | ○ | 95 | ○ | 300 | 0 | 0 |
| Example 18 | 1.1 | ○ | 95 | ○ | 300 | 0 | 0 |
| Example 19 | 1.1 | ○ | 93 | ○ | 300 | 0 | 0 |
| Example 20 | 1.1 | ○ | 93 | ○ | 300 | 0 | 0 |
| Comp. Ex. 1 | 1.5 | X | 80 | Δ | 300 | 13 | 20 |
| Comp. Ex. 2 | 1.7 | X | 75 | X | 350 | 30 | 30 |
| Comp. Ex. 3 | 1.8 | X | 70 | X | 300 | 6 | 10 |
| Comp. Ex. 4 | 2.0 | X | 68 | X | 300 | 30 | 30 |

The evaluation methods for the individual items shown in Table 2 and the marks and signs shown in the evaluation columns of Table 2 are as follows.

[Evaluation Method for Oxidation Resistance]

Measurement System: TG/DTA (6300R Type Commercially available from Seiko Instruments Inc.)

Measurement Conditions:

Sample Mass: 30.00 to 36.00 mg

Temperature Range: 24.0 to 900.0° C.

Temperature Raising Rate: 5° C./min

Holding Temperature: 350° C.

Holding Time: 120 min

Atmosphere: Air (Compressed Air/Drying Treatment)

Flow Rate: 200 ml/min

Figure 2:
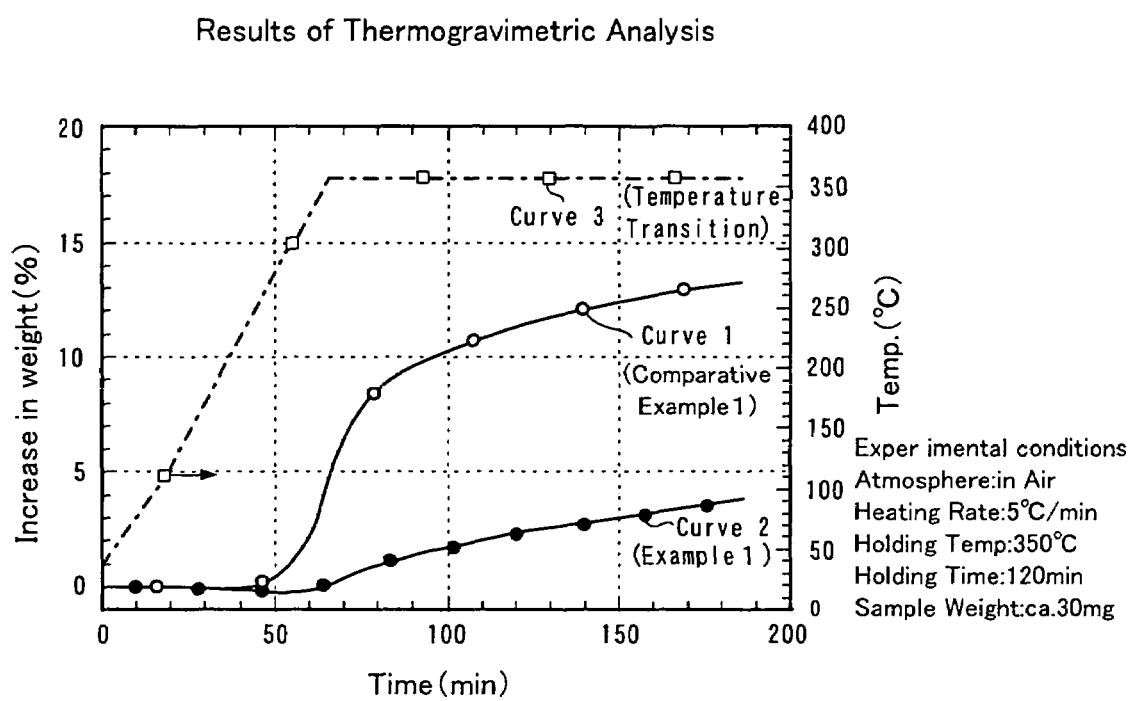
FIG. 2 is a graph showing the results of thermogravimetric analysis.

The oxidation resistance was evaluated based on a thermal gravimetric analysis after each of the samples was held at 350° C. for 120 minutes preceded by heating to 350° C. with uniform temperature raising rate. The oxidation starting temperature was evaluated based on a temperature at which the thermal mass gain corresponds to +0.2% by mass. FIG. 2 shows the thermal mass change versus time (the left coordinate axis). The curve 1 indicates Comparative Example 1. The curve 2 indicates Example 1 of the present invention. It will be understood that the thermal mass change increases as the temperature increases in each of Example 1 and Comparative Example 1 but the thermal mass change has significantly decreased and the oxidation resistance has been improved in the example of the present invention compared with those in the comparative example. The curve 3 indicates a temperature course (the right coordinate axis).

| (Standards for Evaluating Oxidation Resistance) | |
|---|---|
| Thermal Mass Variation: Less than 6% | ◉ |
| 6% or More and Less than 12% | ○ |
| 12% or More and Less than 14% | Δ |
| 14% or More | X |
| Oxidation Starting Temperature: Less than 260° C. | X |
| 260° C. or More and Less than 300° C. | Δ |
| 300° C. or More | ○ |

[Evaluation of Oxidational Expansion of Ultrafine Metal Powder After Degreasing Step]

Each of the multilayer structures after the degreasing step, i.e., each of the green chips of the multilayer ceramic capacitors was set firmly with a resin, polished, and subjected to observation using a microscope at a magnification of 400 times for examining the presence or absence of cracks. The number of samples with cracks was counted. The number of samples evaluated in each of the examples was 30.

[Evaluation of Thickness Reduction and Uniformity of Internal Electrode Film]

Each of the ceramic sintered compacts after heating was fixed firmly with a resin and subjected to observation using a microscope at a magnification of 400 times for measuring the thickness of each of the electrode films. The number of samples evaluated in each of the examples was 30. The uniformity of each of the electrode films was further evaluated by obtaining the coverage rate thereof from the cross-sectional photograph thereof. The coverage rate of each one of the samples used herein was determined by dividing, for each of twenty layers, the length of the electrode layer portion by the length of the ceramic dielectrode layer and calculating an average of the values obtained from the twenty layers. As an electrode thickness which was an evaluation value of each of the examples, an average of the thickness values obtained from thirty samples was used.

| (Standard for Evaluating Film Thickness Reduction) | |
|---|---|
| Thickness of Electrode Film: Less than 1.5 μm | ○ |
| 1.5 μm or More | X |
| (Standard for Evaluating Uniformity of Electrode Film) | |
| Coverage Rate of Electrode Film: 90% or More | ○ |
| 80% or More and Less than 90% | Δ |
| Less than 80% | X |

[Checking of Metal Compounds Containing Sulfide and Atomic Group Represented by SxOy]

Figure 3:
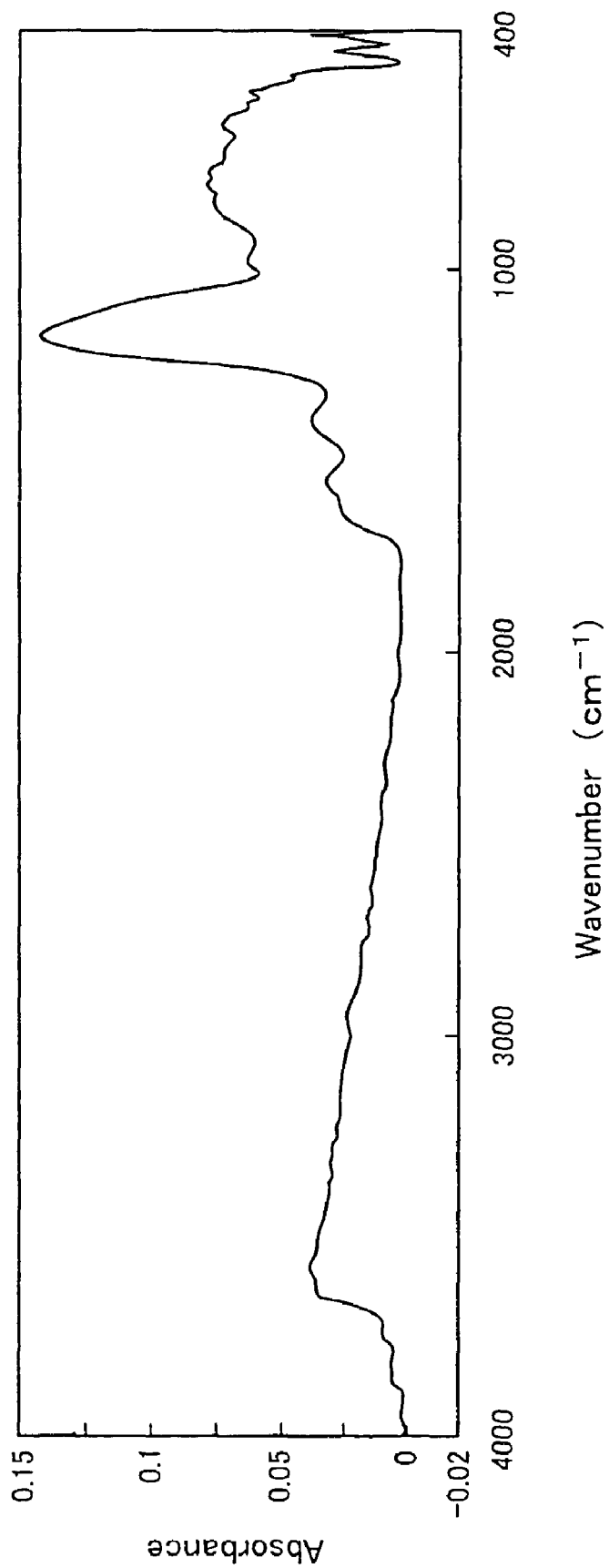
FIG. 3 is a chart showing an example of a Fourier-transform infrared spectrometric spectrum from a material present on the surface of a surface-treated ultrafine powder according to Example 1.
Figure 4:
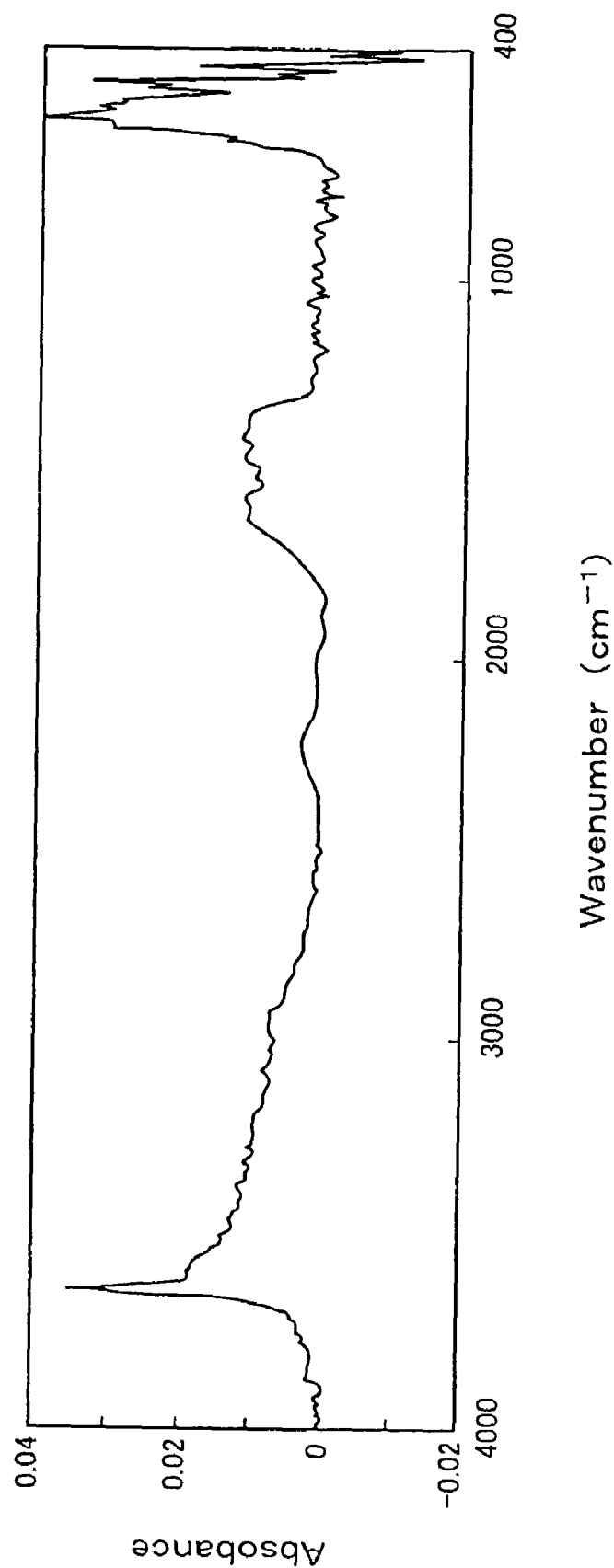
FIG. 4 is a chart showing an example of a Fourier-transform infrared spectrometric spectrum from a material present on the surface of a surface-treated ultrafine powder according to Comparative Example 1 (untreated)
Figure 5:
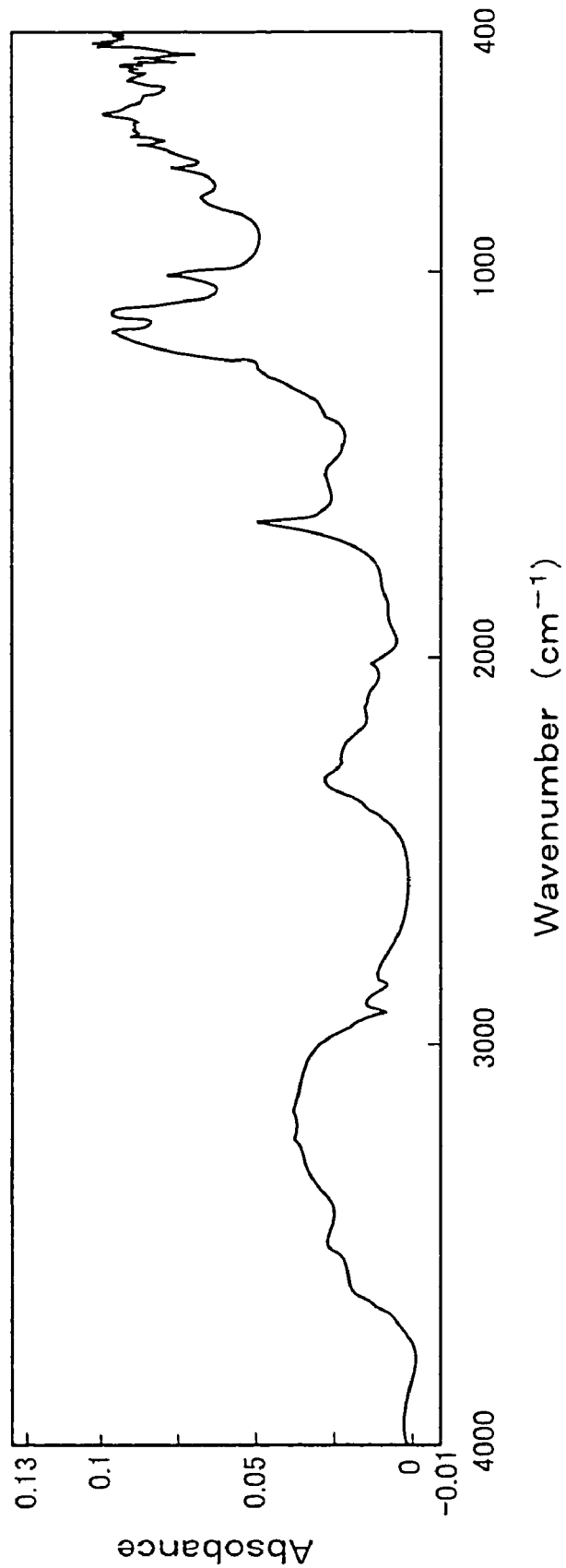
FIG. 5 is a chart showing an example of a Fourier-transform infrared spectrometric spectrum from an yttrium sulfate reagent.
Figure 6:
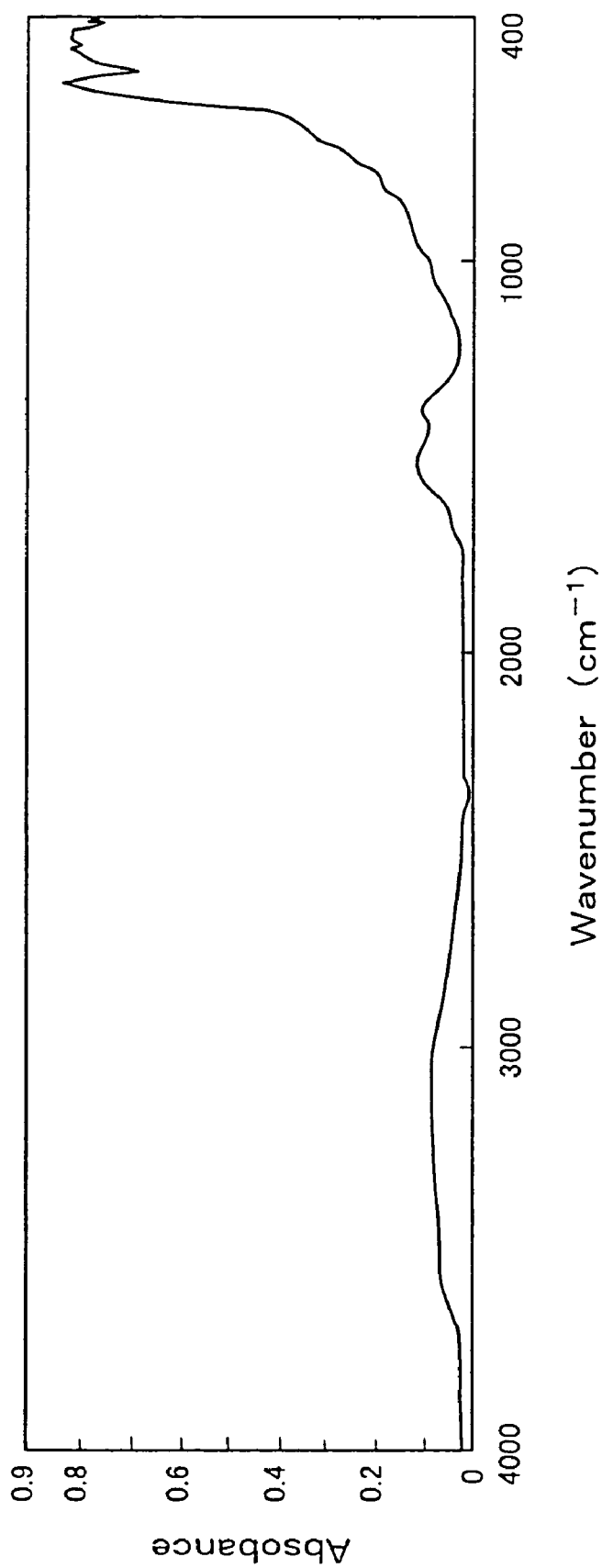
FIG. 6 is a chart showing an example of a Fourier-transform infrared spectrometric spectrum from an yttrium oxide reagent.

The presence of compounds each containing an atomic group represented by SxOy which is $SO_2$ (sulfonyl group), $SO_3$ (sulfurous acid group), $SO_2O_3$ (thiosulfuric acid group), or $SO_4$ (sulfuric acid group) on the surfaces of the ultrafine metal powders obtained in the examples was checked by using a Fourier-transform infrared spectrometer (FT-IR). The result of measurement in Example 1 is shown in FIG. 3, which exhibits an intense absorption band in 1210 to 1040 $cm^{-1}$ and a peak coincident with the peak of the sulfuric acid group ($SO_4^{2-}$). Further, the result of measurement from an yttrium sulfate reagent is shown in FIG. 5, which exhibits an intense absorption band in 1210 to 1040 $cm^{-1}$. The result of measurement from an yttrium oxide reagent is shown in FIG. 6, which does not exhibit an absorption band in 1210 to 1040 $cm^{-1}$. From the foregoing results, the presence of a coating containing a sulfuric acid group ($SO_4^{2-}$) on the surface of Example 1 was identified. FIG. 4 shows Comparative Example 1, which did not exhibit an absorption band in 1210 to 1040 $cm^{-1}$.

[Content of Added Element]

The contents of Y, Zr, La, and sulfur contained in the ultrafine metal powders obtained in the examples were determined by ICP quantitative analysis.

What is claimed is:

1. A surface-treated ultrafine metal powder, wherein a sulfur-containing compound including at least one element selected from the group consisting of Y, Zr, and La is present on a surface of a particle of the ultrafine metal powder, and wherein said sulfur-containing compound is present in an amount such that the at least one element contained in said sulfur-containing compound is present in a total amount of 0.05% to 6% by mass and S contained in the sulfur-containing compound is present in an amount of 0.04% to 4% by mass, each relative to the mass of the ultrafine metal powder as a whole.

2. The surface-treated ultrafine metal powder of claim 1, wherein a metal element of said ultrafine metal powder is one selected from the group consisting of Ni, Cu, Ag, Mo, W, Co, and Ta.

3. A conductive metal paste produced by using the surface-treated ultrafine metal powder as recited in claim 2.

4. A multilayer ceramic capacitor produced by using the surface-treated ultrafine metal powder as an internal electrode as recited in claim 2.

5. The surface-treated ultrafine metal powder of claim 1, wherein said ultrafine metal powder is a powder of an alloy of Ni containing one or not less than two elements selected from the group consisting of V, Cr, Nb, Mo, Ta, W, Zr, Y, La, Mg, Ti, Ba, and Ca.

6. A conductive metal paste produced by using the surface-treated ultrafine metal powder as recited in claim 5.

7. A multilayer ceramic capacitor produced by using the surface-treated ultrafine metal powder as an internal electrode as recited in claim 5.

8. The surface-treated ultrafine metal powder of claim 1, wherein said ultrafine metal powder is a powder of an alloy of Cu containing one or not less than two elements selected from the group consisting of V, Cr, Nb, Mo, Ta, W, Zr, Y, La, Mg, Ti, Ba, and Ca.

9. A conductive metal paste produced by using the surface-treated ultrafine metal powder as recited in claim 8.

10. A multilayer ceramic capacitor produced by using the surface-treated ultrafine metal powder as an internal electrode as recited in claim 8.

11. A conductive metal paste produced by using the surface-treated ultrafine metal powder as recited in claim 1.

12. A multilayer ceramic capacitor produced by using the surface-treated ultrafine metal powder as an internal electrode as recited in claim 1.

13. A method for producing the surface-treated ultrafine metal powder according to claim 1, the method comprising the steps of:
   adding an aqueous solution containing a sulfate of at least one element selected from the group consisting of Y, Zr, and La to a slurry having the ultrafine metal powder dispersed therein; and
   performing a surface treatment for forming a sulfur-containing compound including at least one element selected from the group consisting of Y, Zr, and La on a surface of said ultrafine metal powder, wherein said sulfur-containing compound is present in an amount such that the at least one element contained in said sulfur-containing compound is present in a total amount of 0.05% to 6% by mass and S contained in the sulfur-containing compound is present in an amount of 0.04% to 4% by mass, each relative to the mass of the ultrafine metal powder as a whole.

* * * * *